(12) United States Patent
Milanski et al.

(10) Patent No.: US 8,280,166 B2
(45) Date of Patent: Oct. 2, 2012

(54) COLOR ADJUSTMENT INTERFACE FOR HIGH SPEED COLOR PRINTER

(75) Inventors: John G. Milanski, Louisville, CO (US);
Joan Stagaman Goddard, Boulder, CO (US); Kenneth Stuart Shouldice, Firestone, CO (US); Hong Li, Superior, CO (US)

(73) Assignee: InfoPrint Solutions Company LLC, Boulder, CO (US)

( * ) Notice: Subject to any disclaimer, the term of this patent is extended or adjusted under 35 U.S.C. 154(b) by 1015 days.

(21) Appl. No.: 12/215,965

(22) Filed: Jun. 30, 2008

(65) Prior Publication Data

US 2009/0324124 A1 Dec. 31, 2009

(51) Int. Cl.
*G06K 9/40* (2006.01)
(52) U.S. Cl. ........................................ 382/174; 382/162
(58) Field of Classification Search .................. 345/590, 345/593; 348/333.05, 649, E9.04; 358/518, 358/520, 527; 382/162, 167, 274; 386/241; 715/274, 838
See application file for complete search history.

(56) References Cited

U.S. PATENT DOCUMENTS

| 5,508,718 A * | 4/1996 | Haikin ........................... 345/601 |
| 6,618,170 B1 | 9/2003 | Whiting et al. |
| 7,623,722 B2 * | 11/2009 | Prentice et al. ................ 382/254 |
| 2002/0054157 A1 * | 5/2002 | Hayashi et al. ................ 345/838 |
| 2004/0070619 A1 * | 4/2004 | Yoshio et al. .................. 345/764 |
| 2004/0227964 A1 | 11/2004 | Jujino |
| 2005/0033662 A1 * | 2/2005 | Buch et al. ....................... 705/27 |
| 2005/0163369 A1 | 7/2005 | Jyou et al. |
| 2007/0121180 A1 | 5/2007 | Ogawa |
| 2007/0239843 A1 * | 10/2007 | Knowles et al. ............... 709/217 |
| 2008/0187248 A1 * | 8/2008 | Ikeda et al. .................... 382/305 |
| 2009/0319897 A1 * | 12/2009 | Kotler et al. ................... 715/711 |

FOREIGN PATENT DOCUMENTS

JP 2005175823 6/2005

OTHER PUBLICATIONS

About.com, Thumbnail Sketching, <Jun. 2007, [[retrived on Oct. 11, 2011] Retrieved from the Internet<URL:http://www.google.com/search?tbs=tl:1&q=%2Bthumbnails+%2Bsketches+%2Bcolor+-computer+-display+-photoshop+-adobe&tbs=cdr:1,cd_min:1/1/1900,cd_max:Jun. 29, 2007.*

* cited by examiner

*Primary Examiner* — Gregory F Cunningham
(74) *Attorney, Agent, or Firm* — Blakely, Sokoloff, Taylor-Zafman LLP

(57) ABSTRACT

A color adjustment interface includes an original image thumbnail representing a version of an image prior to modification, a current image thumbnail representing a version of an image after a modification and a color polygon including a multitude of variation image thumbnails each representing a color variation. Each selection of a variation image thumbnail modifies the current image thumbnail in an adjustment towards a color represented by the selected variation image.

18 Claims, 4 Drawing Sheets

COLOR ADJUSTMENT INTERFACE FOR HIGH SPEED COLOR PRINTER

FIELD OF THE INVENTION

This invention relates generally to the field of printing systems. More particularly, the invention relates to adjusting hue of a color print.

BACKGROUND

The color print of an image or document may often differ from the original. When the color of the printed document or image is not as desired, either the preference or accuracy, a printer operator often does not know how to adjust the color settings to obtain the desired color. Conventional color controls have been introduced to assist an operator in selecting a proper color. FIGS. 1-3 disclose mechanisms that include color scales (FIG. 1), color variations (FIG. 2), and color curves (FIG. 3).

Color scales are typically slider controls for cyan, magenta, yellow, and black (CMYK) or red, green, and blue (RGB). The sliders can be a percentage change (0-100%) or a numeric scale (0-255). Color variations are pallets of the same picture shown with different color tints. Color curves may be used to change an amount of a primary color (e.g., red, green, blue) in certain areas of an image, that is a particular tonal range or brightness level (e.g. shadows).

The problem with both scales and color variations is that it is difficult to know what combinations of CMYK will create the change the operator desires. Color curves typically require an especially high level of color understanding. However, operators are unlikely to have much knowledge of color or color theory. Moreover, using color variations does not help the operator learn about colors, enabling the operator to be capable of fixing a similar problem in the future.

Recently, a fourth color control approach has appeared, which attempts to perform color correction using verbal commands. While removing the need for complicated controls and color knowledge, the interface will likely be less precise. If the interface does not have a preview component, the user may become frustrated because the results are not what they expected. For instance, the user may not know a term needed to get an expected result. Additionally, the process may take too many steps.

SUMMARY

In one embodiment, a color adjustment interface is disclosed. The color adjustment interface includes an original image thumbnail representing a version of an image prior to modification, a current image thumbnail representing a version of an image after a modification and a color polygon including a multitude of variation image thumbnails each representing a color variation. A first selection of a first variation image thumbnail modifies the current image thumbnail in a first adjustment towards a first color represented by the first variation image. In another embodiment, the color adjustment interface is included in a printing system.

In yet another embodiment, a method is disclosed including selecting a first variation image thumbnail representing a first color in a color polygon; and modifying colors in a current image thumbnail in a first adjustment toward a first color represented by the selected variation image.

BRIEF DESCRIPTION OF THE DRAWINGS

A better understanding of the present invention can be obtained from the following detailed description in conjunction with the following drawings, in which.

DETAILED DESCRIPTION

A color adjustment interface is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
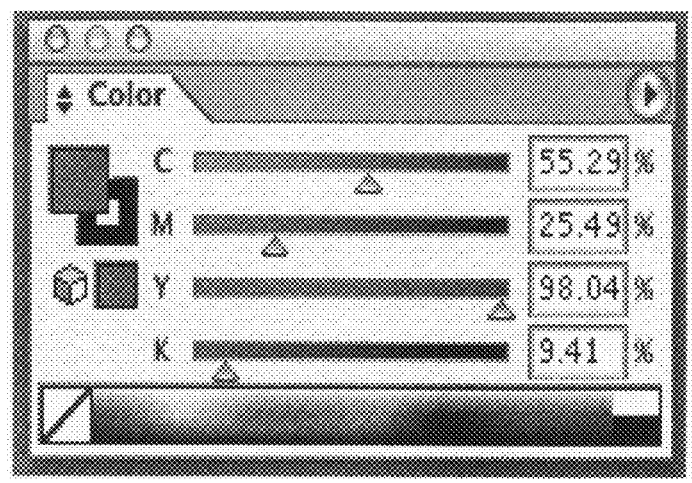
FIG. 1 illustrates an exemplary color scales color control mechanism.
Figure 2:
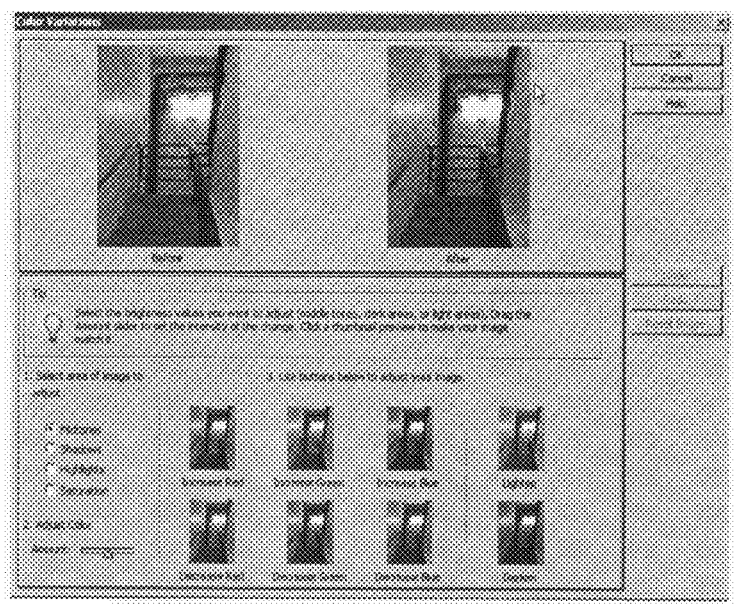
FIG. 2 illustrates an exemplary color variations color control mechanism.
Figure 3:
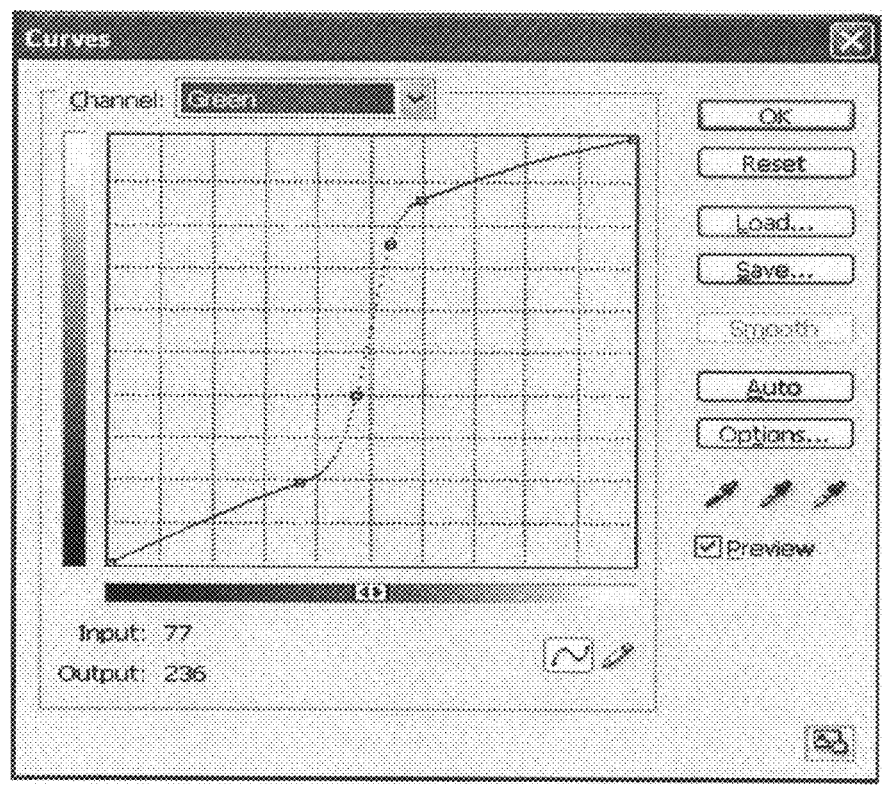
FIG. 3 illustrates an exemplary color curves color control mechanism.
Figure 4:
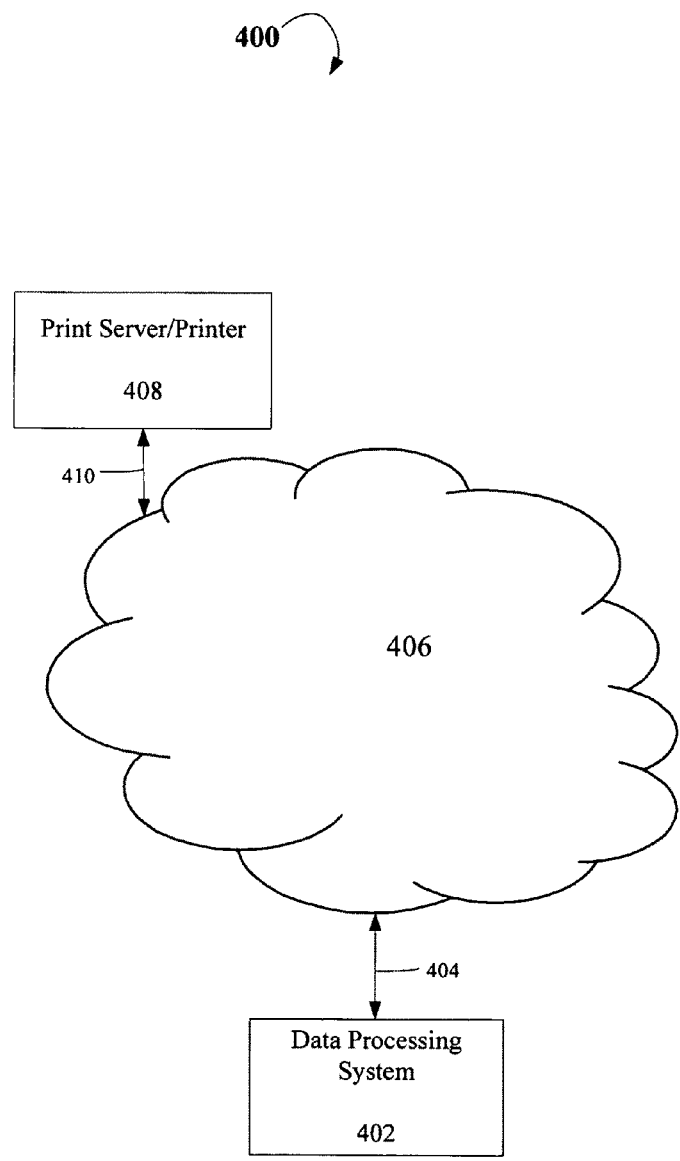
FIG. 4 illustrates one embodiment of a printing system.

FIG. 4 illustrates one embodiment of a data processing system network 400. Network 400 includes a data processing system 402, which may be either a desktop or a mobile data processing system, coupled via communications link 404 to network 406. In one embodiment, data processing system 402 is a conventional data processing system including a processor, local memory, nonvolatile storage, and input/output devices such as a keyboard, mouse, trackball, and the like, all in accordance with the known art. Data processing system 402 in accordance with one embodiment preferably includes and employs the Windows operating system or a similar operating system and/or network drivers permitting data processing system 402 to communicate with network 406 for the purposes of employing resources within network 406.

Network 406 may be a local area network (LAN) or any other network over which print requests may be submitted to a remote printer or print server. Communications link 404 may be in the form of a network adapter, docking station, or the like, and supports communications between data processing system 402 and network 406 employing a network communications protocol such as Ethernet, the AS/400 Network, or the like.

According to one embodiment, network 406 includes a print server/printer 408 serving print requests over network 406 received via communications link 410 between print server/printer 408 and network 406. The operating system on data processing system 402 is capable of selecting print server/printer 408 and submitting requests for services to print server/printer 408 over network 406.

Print server/printer 408 includes a print queue for print jobs requested by remote data processing systems. In one embodiment, print server/printer 408 includes a print server incorporated within a high speed printer. However in other embodiments, the print server and printer may be physically separate entities.

Further, the data processing system network depicted in FIG. 4 is selected for the purposes of explaining and illustrating the present invention and is not intended to imply architectural limitations. Those skilled in the art will recognize that various additional components may be utilized in conjunction with the present invention.

According to one embodiment, print server/printer 408 includes a color adjustment interface that includes a color triangle that allows more color variations and relates the variations to standard color scales. The color triangle allows variations that are combinations of the major colors, which enables an operator to make color adjustments to an image to be printed at the printer. Further, the color adjustment interface teaches a novice operator about color theory, enabling faster adjustments in the future, and facilitating a graduation to more advanced color adjustment techniques in the future (e.g., color curves).

Figure 5:
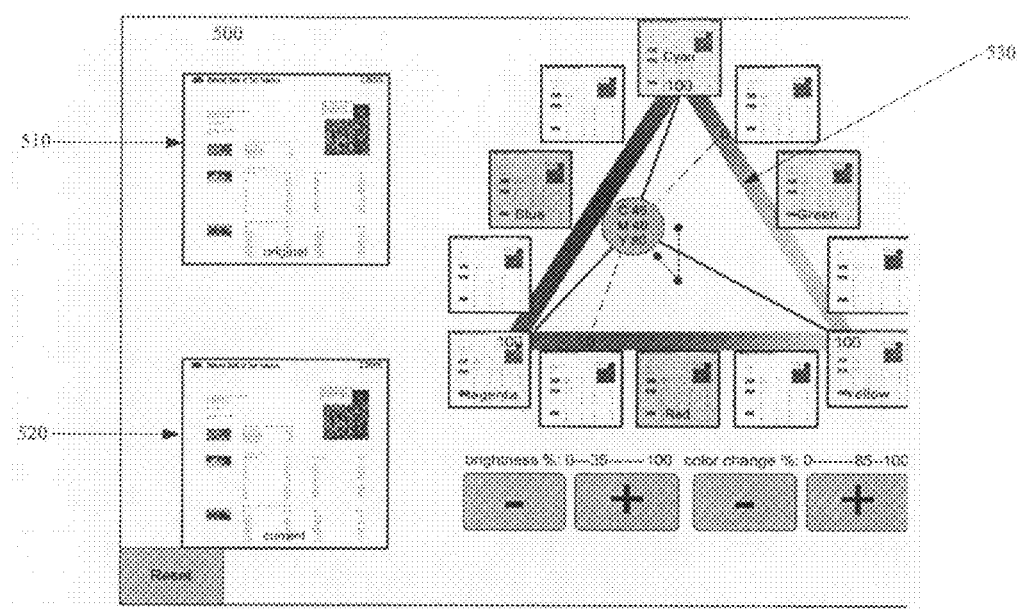
FIG. 5 illustrates one embodiment of a triangle color adjustment interface.

FIG. 5 illustrates one embodiment of a color adjustment interface 500. Adjustment interface 500 may be implemented at a touch screen control panel at the printer component of print server/printer 408 in embodiments where the print server and printer are combined. In embodiments where print server and printer are separate, adjustment interface 500 may be implemented at either a control panel at the printer 408, or at the server where the operator may access via a display device coupled to the server. In yet another embodiment, adjustment interface 500 may be implemented at data processing system 402

As shown in FIG. 5, interface 500 includes a version of an image before modification (original image 510) and after modification (current image 520). Interface 500 also includes a color triangle 530. Color triangle 530 is surrounded by a number of variation images. In one embodiment there are twelve variation images. However in other embodiments, other quantities of variation images may be implemented.

In one embodiment, current image 520 is pushed in a color direction indicated by a particular variation image upon touching the variation image. In a further embodiment, touching the variation image multiple times adds more and more of that color to the current image. If the amount of color change with each touch is too large or small, the operator may incrementally decrease or increase the amount of color change using color change controls (e.g., '+' and '−' buttons) at the bottom of interface 500. The operator may also reset current image 520 to the original image 510 by selecting a 'reset' button.

An advantage of interface 500 is that it enables a user to see variations that are a combination of the major CMY axes. In one embodiment, the positions of the three main variation images Cyan, Magenta, and Yellow (at the vertices of color triangle 530) are fixed. In a further embodiment, the operator can see a limitless number of color variation images covering the entire color spectrum by dragging a variation image with (e.g., using a finger on a touch screen). In yet another embodiment, the variation image is enlarged when touched to provide better visibility.

Before a color change is made (e.g., before any variation image is touched), a circle labeled 'C50, M50, Y50' sits in the middle of color triangle 530 which represents the original image color. The three lines running through the circle represent the three color scales—Cyan, Magenta, and Yellow. According to one embodiment, the circle moves in the direction of the touched variation image as variation images are touched, thus changing the CMY numbers and dragging the three scale lines with it The '0' end of each scale moves while the '100' end is fixed so that the scale lines remain straight. The operator can see the changes to the color scales as he selects different variation images. Over time, the operator will learn how to use the scales directly which is faster and is the first step to understanding color theory. In a further embodiment, the operator can simply drag the circle rather than touch the variation images to make a color change upon understanding how to use the scales. In this embodiment, the operator will always be adjusting two of the major three scales at once.

According to one embodiment, a dot in the middle of triangle 530 represents where the original image was before color adjustment. Each time the operator selects a variation image, or drags and releases the circle, another dot is placed on the screen underneath the new position of the circle. This series of dots operates as a record of what color changes the operator has already made. By touching one of the previous dots, the operator can backup to that color variation if, for example, the operator believes too many color steps have been taken.

Figure 6:
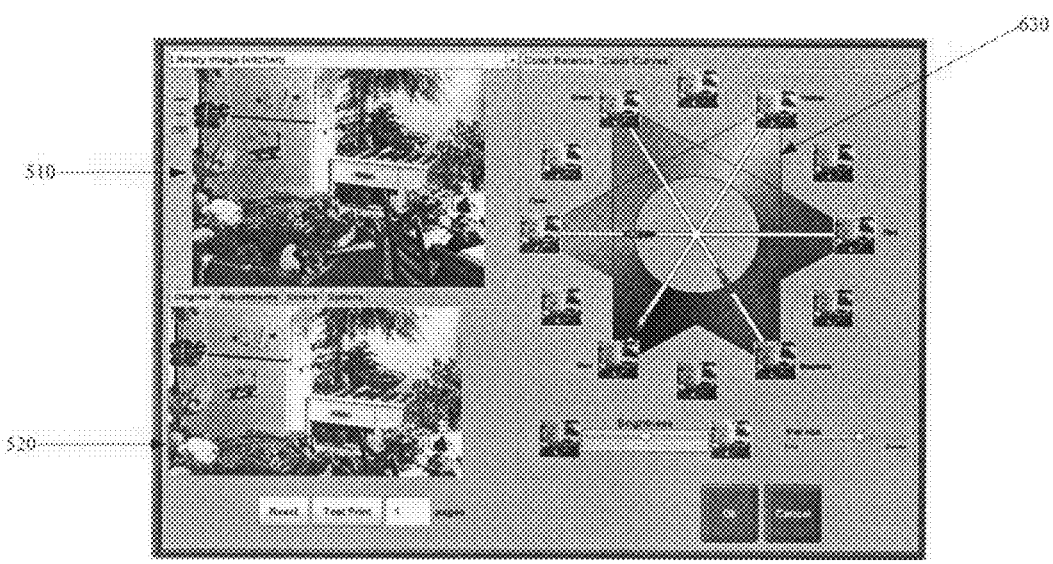
FIG. 6 illustrates one embodiment of a star color adjustment interface.

FIG. 6 illustrates another embodiment of color adjustment interface 500. In this embodiment, a color star 630 is implemented rather than a triangle. Color star 630 provides a slightly different representation where, rather than having the three main color scales (CMY lines) move through an intersecting common point, the scales stay stationary and three points represent the current variation picture. A second triangle joins the RGB colors, hence a color star.

The above-described color adjustment interface operates similar to a color wheel by relating a number of variation images to the major CMY color scales, as well as teaching an operator about color theory.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A system comprising:
   a processor; and
   a display device to display a color adjustment interface, including:
   an original image thumbnail representing a version of an image prior to modification;
   a current image thumbnail representing a version of an image after a modification; and a color polygon including a multitude of variation images each representing a color variation, wherein a first selection of a first of the multitude of variation images modifies the original image thumbnail to a current image thumbnail in a first adjustment towards a color represented by the first variation image and a second selection of the first variation image modifies the current image in a second adjustment towards the color represented by the variation image.

2. The system of claim 1 wherein the color polygon includes a fixed variation image thumbnail at each vertex of the polygon.

3. The system of claim 2 wherein variation images between the vertices of the color polygon are movable.

4. The system of claim 2 wherein the color polygon is a color triangle having cyan, magenta and yellow variation image thumbnails at the vertices.

5. The system of claim 2 wherein the color polygon is a color star having cyan, green, yellow, red, magenta and blue variation image thumbnails at the vertices.

6. The system of claim 1 wherein a first selection of a second first variation image modifies the current image in a first adjustment towards a second color represented by the second variation image.

7. The system of claim 1 further comprising color change controls to incrementally adjust an amount of color change of the image.

8. The system of claim 1 wherein selection of the original image restores the current image to the image before modification.

9. An article of manufacture comprising a non-transitory machine-readable medium including data that, when accessed by a machine, cause the machine to perform operations, comprising:
   modifying a current image thumbnail a first adjustment towards a color represented by a first of a multitude of variation images representing a color in a color polygon in response to a selection of the first variation image; and
   modifying the current image thumbnail a second adjustment towards the color represented by the first variation image in response to a second selection of the first variation image.

10. The article of manufacture of claim 9 comprising a non-transitory machine-readable medium including data that, when accessed by a machine, further causes the machine to perform operations comprising:
    selecting the first variation image thumbnail; and
    modifying the current image thumbnail in a second adjustment towards the first color represented by the first variation image.

11. The article of manufacture of claim 9 comprising a non-transitory machine-readable medium including data that, when accessed by a machine, further causes the machine to perform operations comprising:
    selecting a second first variation image thumbnail representing a second color; and
    modifying the current image thumbnail in a first adjustment towards the second color.

12. The article of manufacture of claim 9 comprising a non-transitory machine-readable medium including data that, when accessed by a machine, further causes the machine to perform operations comprising selecting a color change control to incrementally adjust an amount of color change of the image.

13. The article of manufacture of claim 9 comprising a non-transitory machine-readable medium including data that, when accessed by a machine, further causes the machine to perform operations comprising selecting an original image thumbnail to restore the current image to an image before modification.

14. A printing system, comprising:
    a display device having a color adjustment interface including:
       an original image thumbnail representing a version of an image prior to modification;
       a current image thumbnail representing a version of an image after a modification; and
       a color polygon including a multitude of variation images each representing a color variation, wherein a first selection of a first of the multitude of variation images modifies the original image thumbnail to a current image thumbnail in a first adjustment towards a first color represented by the first variation image and a second selection of the first variation image modifies the current image in a second adjustment towards the color represented by the variation image.

15. The printing system of claim 14 wherein the color polygon is a color triangle having cyan, magenta and yellow variation image thumbnails at the vertices.

16. The printing system of claim 14 wherein the color polygon is a color star having cyan, green, yellow, red, magenta and blue variation image thumbnails at the vertices.

17. The printing system of claim 14 wherein a first selection of a second first variation image thumbnail modifies the current image in a first adjustment towards a second color represented by the second variation image.

18. The printing system of claim 14 wherein selection of the original image thumbnails restores the current image to the image before modification.

* * * * *